Figure 1:
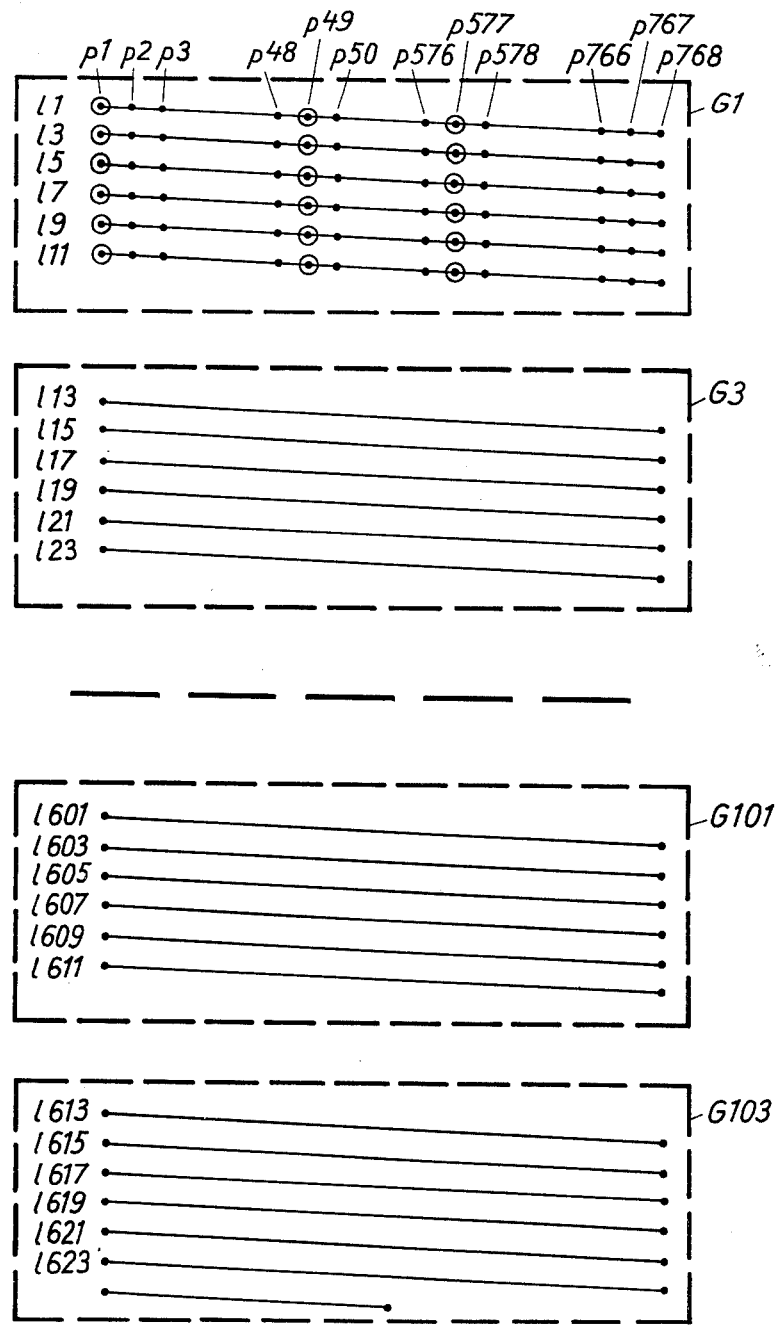

United States Patent [19]
Danell et al.

[11] 3,976,831
[45] Aug. 24, 1976

[54] METHOD FOR TRANSMITTING PICTURES AT A PICTURE TELEPHONE TRANSMISSION HAVING LIMITED BANDWIDTH

[75] Inventors: Curt Danell, Huddinge; Bo Gunnar Holmer, Hagersten; Peder Magnus Rodhe, Saltsjobaden, all of Sweden

[73] Assignee: Telefonaktiebolaget L M Ericsson, Stockholm, Sweden

[22] Filed: Dec. 6, 1974

[21] Appl. No.: 530,091

[30] Foreign Application Priority Data
Dec. 20, 1973 Sweden .............................. 7317209

[52] U.S. Cl. ............................. 178/6.8; 178/DIG. 3; 179/2 TV; 340/324 AD
[51] Int. Cl.² .......................................... H04N 7/12
[58] Field of Search ...................... 178/6.8, DIG. 3; 179/2 TV; 340/324 AD

[56] References Cited
UNITED STATES PATENTS
3,663,749  5/1972  Cannon................................. 178/6.8
3,822,363  7/1974  Moyer ........................... 179/2 TV Primary Examiner—Howard W. Britton
Attorney, Agent, or Firm—Hane, Baxley & Spiecens

[57] ABSTRACT

The present invention relates to a method for transmitting stationary pictures via a picture telephone transmission having limited bandwidth. Both fields of the picture are in the transmitter side divided into a number of line groups. In the first field, certain picture elements in one group are sampled and stored in a buffer memory in the transmitter and the rest of the line groups in the field are scanned without the sampling of further elements. After that, the second field is scanned in similar manner. The transmission of the stored values of the sampled elements are transmitted with a rate determined by the bandwidth of the transmission media and during the time when the rest of the line groups in the field are scanned.

2 Claims, 6 Drawing Figures

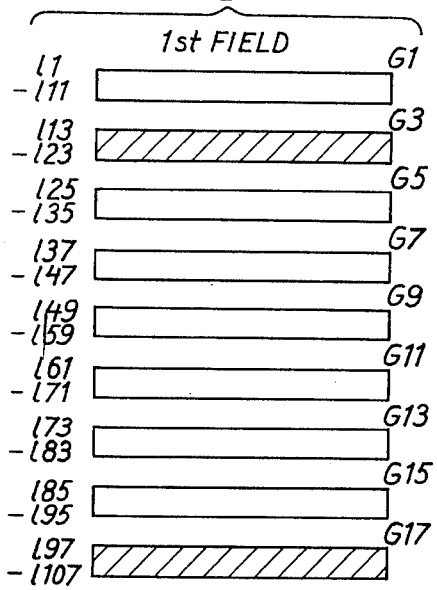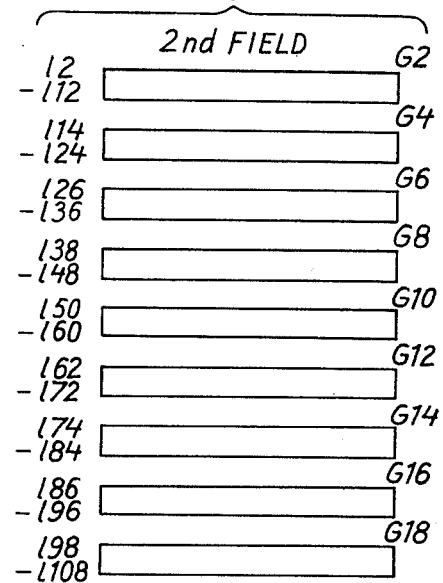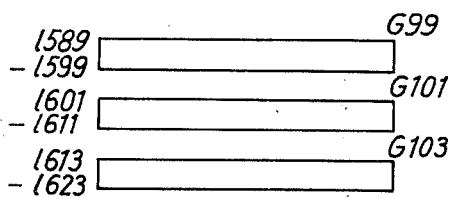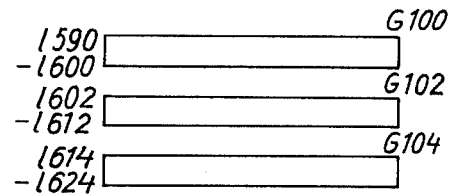

METHOD FOR TRANSMITTING PICTURES AT A PICTURE TELEPHONE TRANSMISSION HAVING LIMITED BANDWIDTH

The present invention relates to a method for transmitting pictures in a picture telephone equipment for the case the picture object is stationary, i.e. does not contain any movement information, but in which the picture details are important and thus requires good resolution of the picture. The invention is preferably applicable for a picture telephone transmission of such kind wherein the picture is composed by a number of mainly horizontal lines which each can be split up into a number of elements. In order to transmit the picture, the light intensity of each such picture element is sampled in the transmitter side and is converted to the corresponding signal information which is transmitted to the receiver.

During picture telephone transmission over a long distance, for example, across trunk lines, it is necessary, due to reasons of costs, to utilize a bandwidth which is essentially less than that which is used for, for example, ordinary television links. The actual transmission bandwidth can in a picture telephone transmission to about 5 MHz down to the bandwidth of a telephone speech channel. It has been found that a bandwidth of about 1 MHz fullfills acceptable demands as to the picture sharpness in the case of face-to-face communication. If it is intended with the same bandwidth to transmit a picture rich in details, for example, typewriter text, the resolution in the line direction must be higher than at face-to-face communication in order to obtain a sufficiently good resolution of the picture. If then the same line and picture repetition frequency in the both cases is utilized, the bandwidth will not be enough in the former case to resolve a text line having about 75 elements if the format of the picture object, for example, corresponds to the upper half of a letter having the total format area of 200 × 300 mm.

If the transmission bandwidth is lowered to values much less than 1 MHz, one is completely restricted to the transmission of what visually appears as separate stationary pictures. If the demand of the high resolution of the picture is maintained and the transmission capacity of the media is limited, the transmission time will normally be about a few minutes. In order to minimize the sum of transmission time and the time for reading of, for example, a letter, the picture is according to the suggested method transmitted in complete form from the top to bottom in the picture if these longer transmission times are used. The transmission time and the time for reading out in the receiver will then mainly coincide.

There are previously known a number of methods by means of which it is possible to transmit a picture of the above mentioned kind via a picture telephone transmission channel having limited bandwidth. One known method, forexample, according to the U.S. Pat. 3,663,749, teaches that from the first field discrete picture elements are sampled which, regarding the line progress, are equally distributed, i.e. the sampled picture elements are equally distributed with respect to all the lines in one field. The picture elements are then equally orientated to the start of one line and coincide in time with a constant frequency. When transmitting the second field, the sampling of a picture element is displaced one step relatively to the element which was sampled in the first field and the sampling process continues in the same manner as at the first field until the second field has been scanned. By repeating this process for a number of fields, the whole picture can be scanned in the transmitter. The sampled picture elements are then stored in a memory in the receiver side and, when the whole picture has been received, the memory is read out. A drawback of this method is that all the elements in the scanned picture must be stored in the receiver memory, even if only parts of the transmitted picture is desired to be interpreted. This implies that, if the bandwidth is further diminished, for example, down to 4 kHz (a speech band), further time must elapse in order to store the whole or parts of the transmitted picture.

An object of the present invention is to transmit picture information via a limited bandwidth of a picture telephone equipment so that the information can be presented in time with the transmission rate and so that complete information can be obtained for each line in the picture even from the start of the transmission.

By the suggested transmission method it is possible, already during the transmission, to read out the transmitted information on the picture screen in the receiver side, in the case, for example, a written message is to be transmitted, whereby the total transmission and the read out time can be reduced. In addition, a short message on the top of the picture needs correspondingly less transmission time before it is complete. By means of the suggested transmission method, stationary pictures can be transmitted across a bandwidth down to about 4 kHz.

Figure 4:
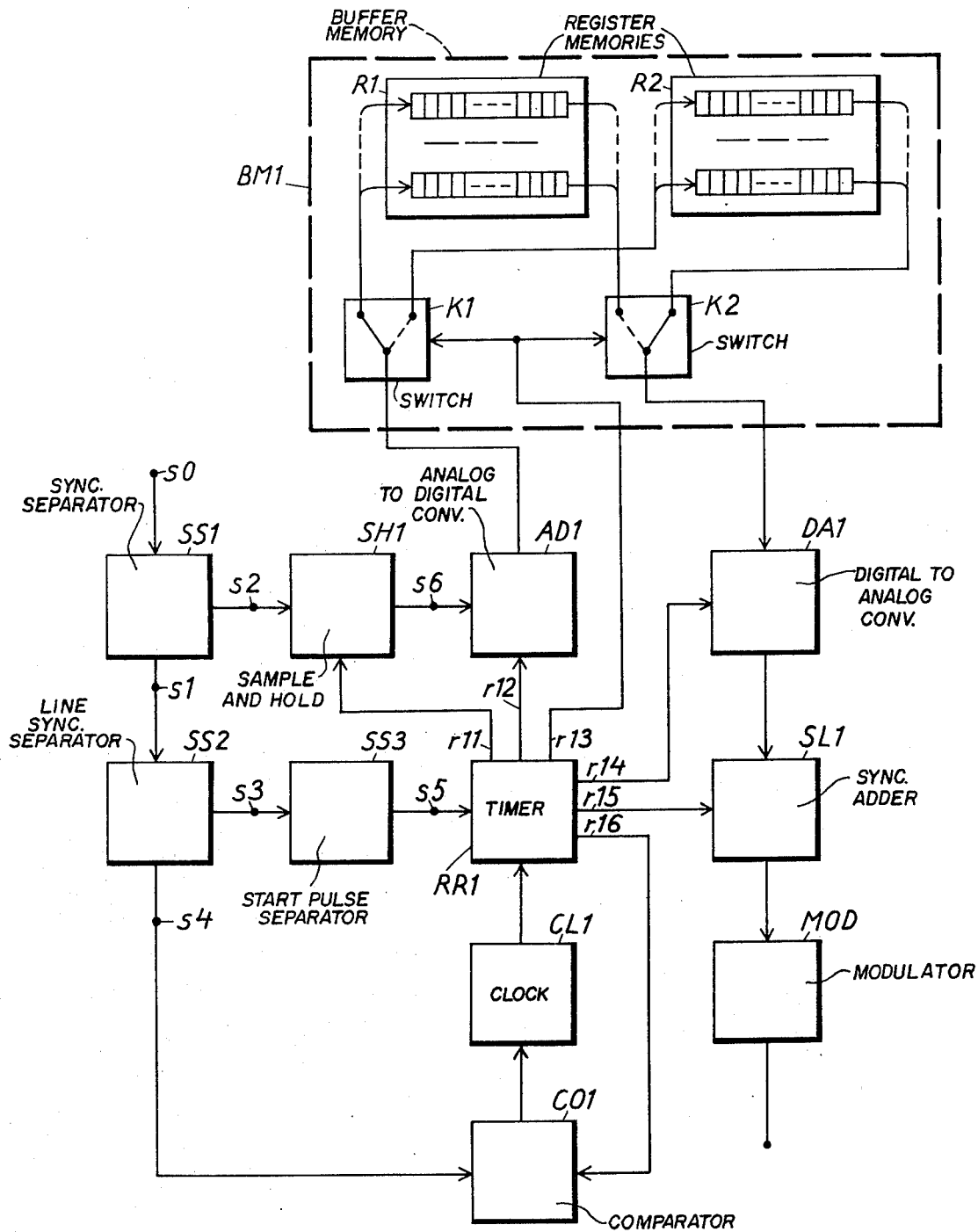
Figure 5:
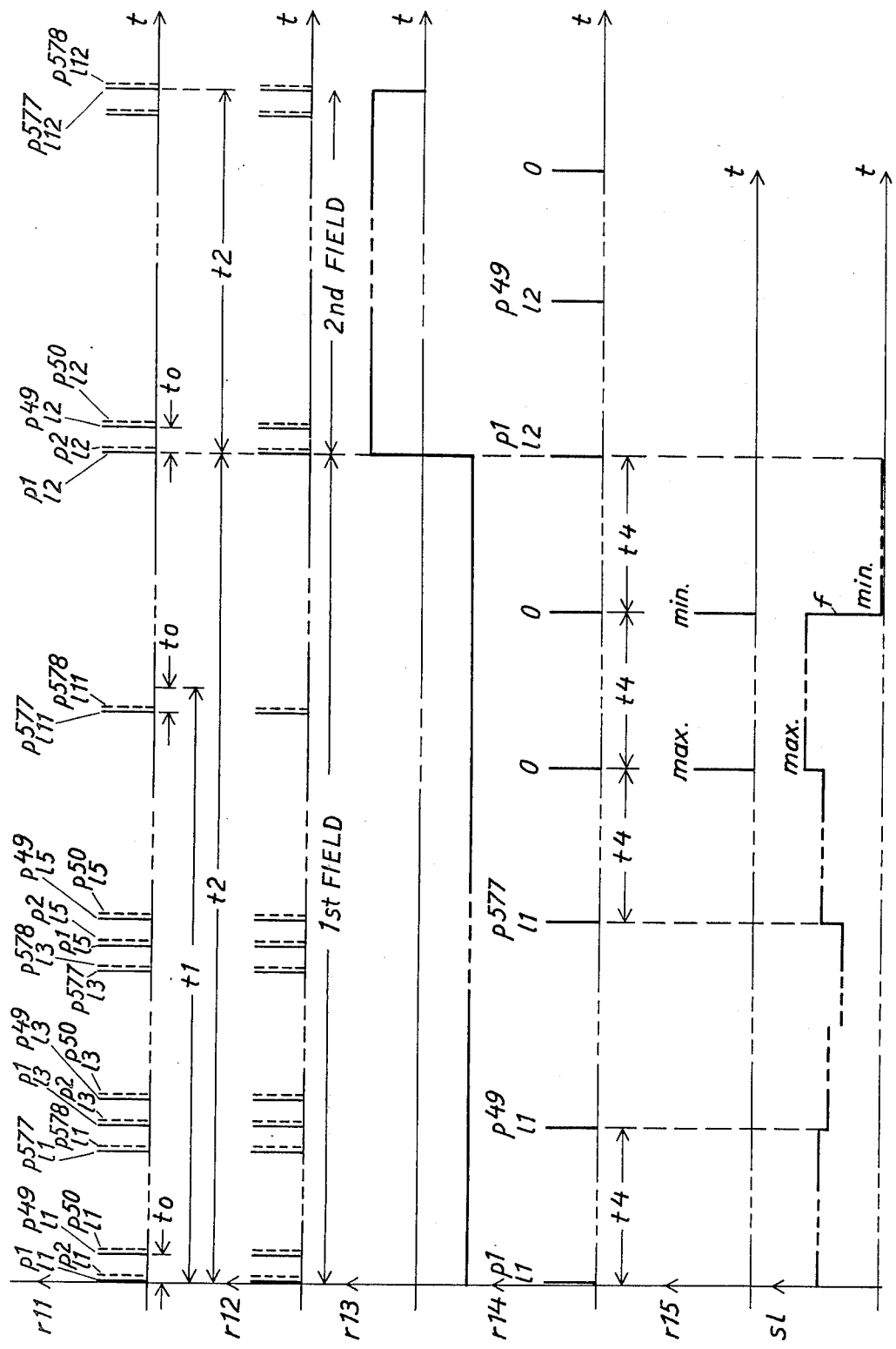
Figure 6:
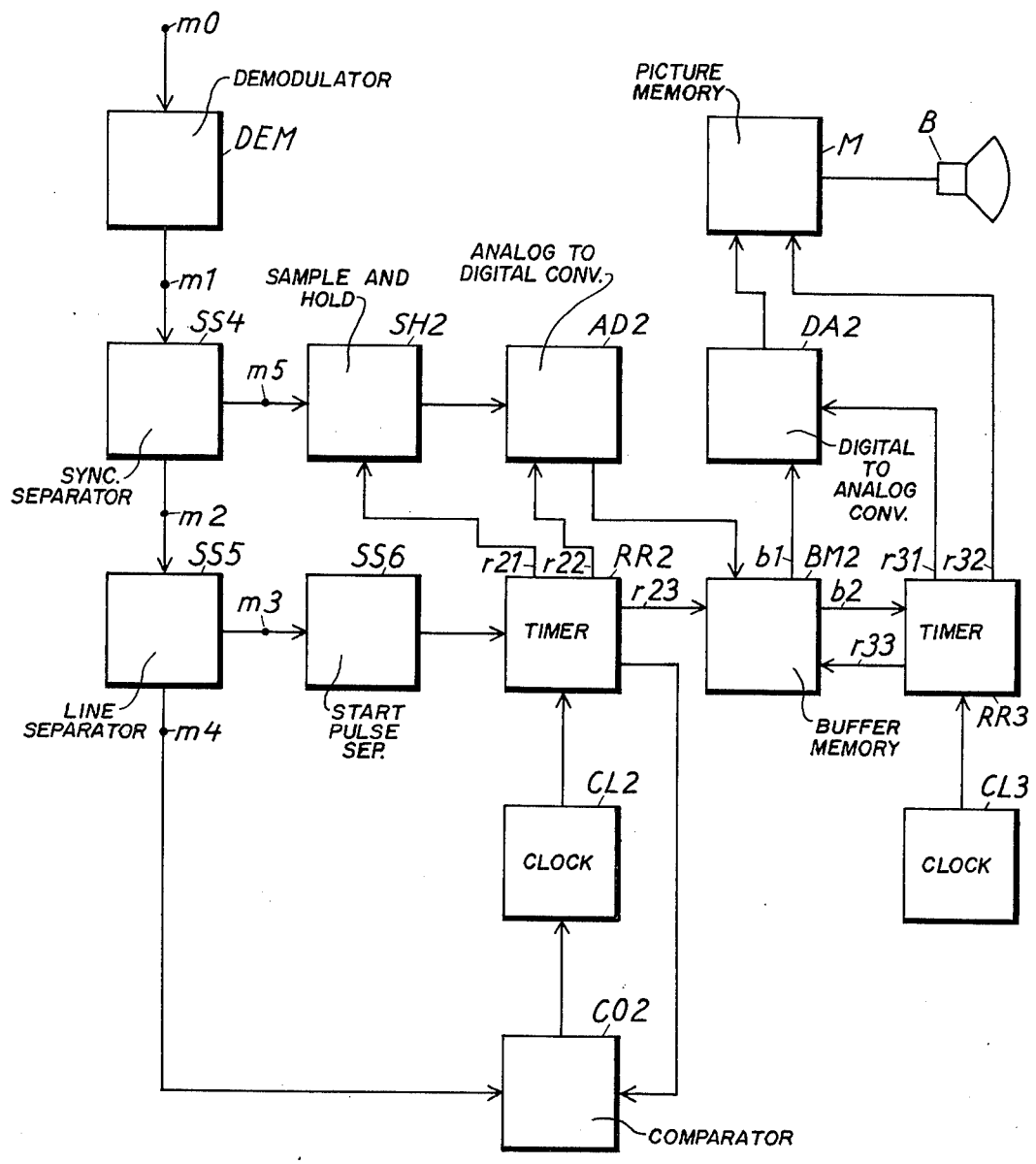

The invention, the characteristics of which appear from the appended claims, will be more fully described with reference to the accompanying drawing in which FIG. 1 shows the structure of a field in a picture telephone equipment which utilizes the method according to the present invention, FIGS. 2 and 3 show schematically line groups included in a first and a second field, respectively, in order to explain the method according to the invention, FIG. 4 shows a block diagram of the transmitter side in a picture telephone transmission in which the method according to the invention is carried out. FIG. 5 shows a timing diagram of the signals which appear in the transmitter side as well as in the receiver side and FIG. 6 shows a block diagram of the receiver side in the picture telephone transmission.

With reference to FIG. 1, the method according to the invention will now be described. FIG. 1 shows schematically the composition of a field which appears in the picture telephone equipment of the kind mentioned in the introduction. It is assumed that the picture consists of a number of lines, each of which can be divided in a number of picture elements, in the figure designated p1–p578. In the embodiment, as it is described in the following, the number of lines in one field is equal to 625/2 = 312½ and the number of elements per line is equal to 768. When scanning a picture, normally the light intensity of all the elements of the different lines are sampled and converted in a known manner to picture signals. In the method according to the present invention, a sampling of a certain number of elements on each line is performed while a number of intervening elements are ignored. On a certain number, for example, the 6 first lines of the field is performed. In FIG. 1, therefore, 6 consequtive lines have been grouped together thus forming a line group, so that a number (52) of such line groups forms one field in FIG.

1. FIG. 2 shows schematically the lines thus grouped together in the first field. The groups are in FIG. 2 designated G1–G103 all in the first field and in FIG. 3 the groups designated by G2–G104 belonging to the second field. Starting from the first line 11 (FIG. 1) the element p1, p49, p97, . . . , p577 are sampled. Thus the 47 elements between each sampled element are jumped over, i.e. only every 48th element on each line in the group G1 will be sampled. The number of elements on a line is equal to 768, for which reason 16 samples in fact would be carried out for each line (768/48 = 16). However, as it will be explained later, only 13 samples for each line in the 6-line group G1 is carried out. From the group G1 thus 13 × 6 = 78 samples of a certain video signal is obtained and the samples are converted from an analog amplitude to their digital value, as will be described in connection with FIG. 4. The 78 samples will, after having been converted to digital form, be stored in a buffer memory as 8-bit words and to these 78 words 2 zero words are added in order to provide space to store synchronizing signals, i.e. the buffer memory will store 80 8-bit words.

When scanning the second field according to FIG. 3 which follows both the sampling of the elements in a 6-line group in the first field the scanning of the remainder of the first field without sampling any further elements, the elements p1, p49, . . . , p577 are sampled in the first line belonging to the second field (FIG. 3) designated by the order number G2 in FIG. 3. This is performed for the first 6 lines of the second field, which lines like in the first field according to FIG. 1 have been grouped together to a 6-line group.

When scanning the line group G1, the elements p2, p50, . . . , p578 are sampled, i.e. the sampling of the elements has been displaced one step relatively to the sampling of the preceding picture. This is repeated for each line in this 6-line group, i.e. the lines designated by 11 – 111, c.f. FIG. 2. The method is repeated by sampling the same elements in the lines 12–112 of the group G2, c.f. FIG. 3. This sampling process is alternately repeated between the groups G1 and G2 and when all the elements of the 6 lines included in each group G1, G2 have been sampled, the sampling is transferred to the next line group G3 which belongs to the first field and is transferred to the line group G4 which belongs to the second field. The scanning of these 6-line groups then takes place in the same manner as at the first groups G1 and G2 according to the above described.

According to the invention idea, thus, each field belonging to a picture is divided into a number of line groups (G1–G103 and G2–G104, respectively) which can be selected by a scanning device which is controlled by a clock and associated counting circuits. Beginning with a starting pulse, thus, all the sampled elements belonging to the first and to the second field, respectively, are pointed out in a certain order and in the above described sequence. The counting circuits then have been given such a design that the complete picture in the main is built up from the top to bottom. The scanning is carried out only for a few numbers of lines, for example, 6 in each field, and on the picture screen mainly coinciding lines until these lines have been completely scanned, thereafter the the next lower set of lines are to be scanned until the elements of a whole picture have been completely sampled. The binary values representing the analog values of the video signal in the sampled elements, are stored in a buffer memory. Then after all the elements in a line group have been stored, they are read out in accordance with the timing which is permitted by the bandwidth of the transmission media. Normally the reading out takes place during the time which is required on the one hand for scanning the remaining line groups in the same field, and on the other hand for scanning line groups in the following field and to the line group in which scanning again takes place. The buffer memory can consist of two register memories connected in parallel, for example, shift registers, each being associated with the first and the second field. However, if the rading out from these registers is so rapid that the second register memory is emptied before the first register memory has been fully loaded, it is possible, during the same field scanning, to write in the second memory the values from another line group belonging to the same field with the condition that each line group is completely scanned. For example, after the writing in of the line group G3 to the first register memory, also the values of group G17 can be written into the other register memory if this has been read out, c.f. FIG. 2, where the area of the groups G3 and G17 have been dashed. Therewith it is not necessary that the same element position in these groups be sampled, but if the elements p1, p49, etc. in the group G3 have been sampled, the elements p2, p50 etc. in the group G17 are sampled instead.

With reference to FIGS. 4–6 apparatus for performing the method of the invention will be described. In FIG. 4, the entity SS1 denotes a syncsignal separator which at its input sO receives a video signal according to CCIR-standard with the exception of equalizing pulses. The signal separator SS1 divides the video signal into a picture signal appearing at an output s2 and into the synchronizing signals (picture synchronizing signal and line synchronizing signal) at a second output s1. To the output s1 of the signal separator SS1 another signal separator SS2 is connected for the separation of the line synchronizing signals. The output s2 of the unit SS1 across which the picture signal appears is connected to a sample and hold circuit SH1 for sampling the incoming picture signal in dependence on pulses which are delivered from the timer block RR1 containing counting circuits. By SS3 a unit is designated for the separation of a starting pulse obtained from a marked picture synchronizing signal which pulse zero-sets counting circuits inthe block RR1 at the beginning of the transmission. The stepping forward of the counting circuits is controlled by a clock circuit CL1 having a clock frequency of, for example, 12 MHz. From the separation unit SS2 and the counting circuits of timer RR1, on the one hand the incoming line synchronizing signal is obtained and, on the other hand, a line synchronizing signal generated by the counting circuits is obtained, the signals of which are supplied to the two inputs of a comparator circuit C01. This circuit carries out a comparison of the phase position of these two signals and the results of the comparison is supplied to the voltage controlled crystal clock CL1 so that it will oscillate synchronously in phase and with a certain determined frequency. The counting circuits in the block RR1 are so designated that, within the time interval of a scanned line (64 μs), 768 periods in the clock signal are generated by the clock. Each such period is associated with one element on the line being scanned. As the period time of the clock CL1 is 1/12 μs, thus, after 768 × 64 μs, one line will be scanned. Of this time (64 μs) 52 μs is used to sample 13 elements, while the time 64 − 52 = 12 μs is the time for resetting of the line. When a starting pulse is obtained from the unit SS3, the aforesaid comparison between the generated and the obtained line synchronizing signal takes place and after that, from the counting circuits RR1 from the output r11, pulses are delivered having correct phase positions and a frequency which corresponds to the frequency with which the elements in the picture are sampled. In accordance with what has been mentioned above, only every 48th element is pointed out and after sampling in the sampling and hold circuit SH1 the obtained analog values are supplied to an analog-to-digital converter AD1 which converts each sampled element of the line an eight-bit word at the output of the converter. By BM1 a buffer memory is designated which contains two register memories R1 and R2 of the same design. The memory R1, for example, consists of 8 registers each having 80 positions, 2 registers being shown in the Figure, and the inputs of each memory across the block K1 being connected to the converter AD1. The block K1 then symbolizes 8 similarly designed electronic contact devices which both and simultaneously assumes the same position which in the Figure has been symbolized by the full drawn and the dashed drawn position, respectively. The position drawn in full of the contact indicates that writing in to the memory R1 from the converter AD1 is to take place and the dashed drawn position of the same contact indicates that writing in to the memory R2 is to take place. The writing in of each digital word from the converter AD1 takes place in parallel form and in such a manner that the most significant digit is fed to the upper register and the least significant digit to the lowest register in the memory R1. Thus, 80 eight-bit words can be stored in the memory R1 corresponding to all the sampled values from a 6-line group together with two zero words. In the same manner writing in to the memory R2 takes place when the contact in the block K1 is in its dashed drawn position. The block K2 represents, like the block K1, eight similarly designed contact devices for the control of the reading out from the memories R1, R2, respectively. When the contact in the block K2 is situated in the position shown in the figure, reading out from the memmory R2 takes place in the corresponding manner as the writing in to the memory R1 in accordance with what has been mentioned above. Thus, the writing in to the memory R1 takes place during the time for the reading out from the memory R2. The block K2 is connected to the input of a digital-to-analog converter DA1 for the conversion to analog form of the digital values which have been stored and read out from each of the memories R1, R2, respectively. The output of the converter DA1 is connected to the input of a sync adding unit SL1, the output of which is connected to a modulator equipment MOD. The adding unit SL1 has for its purpose to supply the start and the synchronizing signals to the analog signals which are obtained from the converter DA1. The thus completed signal is then transmitted to the receiver side after modulation in the modulator equipment, for example, as a frequency modulated signal.

The analog value which represents the sampling of an element is thus stored ito a buffer memory BM1 which, after that, is cleared in accordance with the timing which is permitted. The buffer memory contains two register memories R1, R2 each of which in this embodiment is associated with the first and the second field of a picture, so that the first register memory stores the sampled values from the line groups belonging to the first field and the second register memory stores the sampled values from the line groups belonging to the second field. The reading out of the contents in the respective register is controlled by counting circuits previously known and with respect to the selected rate of the transmission. To the digital-to-analog converter DA1 also two synchronizing bits are supplied to the position for the above mentioned zero words which bits are formed by a maximum amplitude followed by a minimum amplitude. The completed signal thus obtained is after that supplied to the modulator equipment MOD which converts the amplitude information from the adding circuits SL1, for example, to different frequencies between two limits corresponding to the black level and the white level of the scanned picture. When one of the memories R1 or R2 in the buffer memory BM1 is read out, a new writing in of the values from the analog-to-digital converter AD1 corresponding to the next following 6-line group takes place. If, for example, the memory R1 has been cleared, a new writing in to this memory takes place during the time for successive reading out of the memory R2. If, for example, into the first memory R1 the sampled values from the lines 125–135 (line group G5) have been inscribed with the first, 49th, . . . , 577th element in each line, then the corresponding values of the elements from the lines 126–136 (line group G6) appears in order to be inscribed into the second memory R2 when the first memory R1 has been read out. During the reading out of the memory R2, the value corresponding to the sampling of the elements p2, p50, p578 belonging to the lines 125–135 are inscribed into the first memory R1 in accordance with what has been mentioned above. In the same manner the writing in of the memory R2 takes place when the first memory R1 has been read out. When all the element positions on the lines 125–135 belonging to the first field and the lines 126–136 belonging to the second field have been sampled, the next lower sampling is displaced one step to the 6-line group and so on, until the whole picture has been scanned.

FIG. 5 shows a time diagram for the signals which appear across the outputs r11, r12, r13, r14 and r15 from the counting circuit RR1. From the output r11 to the sampling and hold circuit SH1 pulses having short duration (83 ns) and having a time distance t0 ( = 4 μs) are delivered each of these pulses controls the sampling of a certain element on a line. The designation p1, 11 above the first pulse thus indicates that this pulse determines the sampling instant of the element p1 on the line 11 according to FIG. 1. The time interval t0 is then so chosen that the next pulse determines the sampling of the elements p49 on the same line (c.f. FIG. 1) and so on, as every 48th element at each scanning is to be sampled. Within the time interval t1, 78 elements on each of 6 lines have been sampled by the circuit SH1, i.e. the last pulse within the interval determines the sampling of the element p577 on the line 111 according to FIG. 1. During the time interval t2−t1 no pulses are delivered across the output r11, as during this time the other lines in the field are scanned by the scanning camera of the picture telephone set. This time is thus determined by the time for the scanning of one 6-line group (t1) and the time (t2) for a field scan and thus can be utilized for the reading out of a register memory already stored, as it appears from the pulses fed out from the output r14. After the time t2, again pulses will be delivered across the output r11 in order to control the sampling of the elements p1–p577 on the second field. The dashed drawn pulses indicate the pulses which are delivered from the output r11 when the first field of the next picture is to be scanned which pulses determine the elements which are displaced one step relatively to the foregoing, as described above.

Across the output r12, control pulses are delivered to the analog-to-digital converter AD1 for converting an analog value to an 8-bit digital word. The control pulses thus are delivered in time with the control pulses which acrossthe output r11 are delivered to the sampling and hold circuit SH1.

Across the output r15 pulses appear which control the contacts K1 and K2 for the writing in and the reading out of the resgister memories R1 and R2. The output r13 then assumes a high level during the time t2 for one field, whereby the contacts K1, K2 are positioned in accordance with that in the FIG. 4 shown left position, the writing in and the reading out from the memories R1 and R2, respectively, taking place. During the next field a pulse with low level is delivered during the same time (t2), the contacts K1, K2 assuming the (dashed drawn) right position and the writing in and reading out from the memories R2 and R1, respectively, takes place. The writing in to the memory R1 and R2 takes place with the same timing as the conversion of the sampled analog values to digital words in the converter AD1, for which reason the memories are stepped forward according to this timing.

Across the output r14, pulses are delivered which control the digital-to-analog converter DA1. The time t4 between two consecutive pulses is determined by the chosen transmission rate in the picture transmission. For example, this rate is chosen equal to 1250 bits per second (the bandwidth of an ordinary telephone line), for which reason analog pulses from the converter DA1 are repeated with a time interval of 1/1250 seconds = 800 $\mu$s = t4. Totally thus a 6-line group demands (78 + 2) × 800 $\mu$s = 64 ms which is the time required for the reading out from one of the memories R1, R2.

From the output r15 two control pulses are delivered during each time period t2 in order to activate the sync adding unit SL1. Thus this unit will add an analog maximum value and an analog minimum value to the obtained analog values at a certain instant and for each 6-line group which values from one for each group determined synchronizing signal.

In FIG. 5 also the characteristic of the signal from the output s1 of the sync adding unit SL1 is shown. This signal consists for each line group of a number of analog levels 1–78 which represent the different values in the scanned picture signals together with two maximum and minimum amplitudes designated by max. and min., respectively, and which represent the synchronizing information for one line group. Only the signal of the first field is indicated in FIG. 5.

With reference to FIG. 6, the receiver side will be closer described. This is built up in similar manner as the transmitter side according to FIG. 4. The incoming and from the transmitter side transmitted signal appears across the terminal m0 which constitutes the input of a demodulating equipment DEM for converting the in the transmitter side frequency shifted signal to a signal with determined analog levels. At the sync separator SS4 across the terminal m1 there thus arrives a signal corresponding to the signal which was obtained in the transmitter side from the sync adding unit SL1 and which signal contains analog picture information together with synchronizing information as shown in FIG. 5 (output s1). Across the output m5 of the sync separator SS4 the picture signal is obtained. In the unit SS5 the line group synchronizing signals are separated which appear across the output m4 and binary coded picture signals, respectively, which appear across the output m3. The group synchronizing signal can be obtained in the unit SS5 by sensing the flank $f$ according to FIG. 5 between the indicated maximum and minimum level and multiplying suitable chosen time factors in dependence on the number of line groups per picture. From the picture signal and in the unit SS6, in corresponding manner as in the transmitter side, a starting pulse to the counting circuits included in the block RR2 of the receiver side is separated. The line group synchronizing signals obtained from the output m4 are like the line synchronizing signal in the transmitter side utilized in order to be compared in the comparator unit CO2 with one by the counting circuits RR2 generated comparator signal, the result of the comparison giving a signal which controls the clock circuit CL2 to the correct frequency and phase position relatively to the incoming picture information.

The counting circuits which are included in the block RR2 control the writing in of the digital 8-bit words which are obtained from the converter AD2 to the buffer memory BM2. This memory is of the same design as the buffer memory BM1 in the transmitter side. Across the outputs r21 and r22 of the block RR2 control pulses are obtained with the same timing as those from the output r14 of the block RR1, c.f. FIG. 5. The sampling and the conversion of the picture information thus takes place in time with the pulses across the output r14 of the block RR1 and storing in one of the registered memories of the block RR2 takes place according to this timing. Across the output r23 corresponds to the output r13 of the buffer memory BM1 control pulses are delivered to the electronic contacts which like the contacts K1, K2 in the buffer memory BM1 are included in the buffer memory BM2. Across the output b1 from one of the register memories in the buffer memory BM2 digital 8-bit words are read out to the digital-to-analog converter DA2. The block RR3 contains counting circuits for the control of the conversion in the digital-to-analog converter DA2 across the output r31 and for the control of the writing in from the converter DA2 to the picture memory M across the output r32. Clock pulses to the counting circuits RR3 are obtained from the clock CL3 which oscillates on the same frequency, i.e. 12 MHz as the clocks CL1, CL2. Across the output r33 pulses are delivered to the buffer memory BM2 in the same timing as the pulses across the output R12 from the memory BM1 on the transmitter side. When this buffer memory BM2 has been filled, a condition signal is delivered to the counting circuits RR3 across the output b2 which signal permits the reading out from the buffer BM2 to the converter DA2 and from this further into the picture memory M. The reading out is controlled from the counting circuits in the block RR3 via the output r33. The reading out is coordinated with timing pulses to the converter DA2 acrossthe output r31 and with timing pulses continuously delivered from the output r32 to the memory M which pulses for this memory determine the time for the line and picture deflection. Across the output b2 also a pulse is delivered when all the digital values belonging to both the first and the second field has been stored in the buffer memory BM2 and which indicates that the timing pulses to the converter and to the picture memory are to be displaced one step. c.f. the dashed pulses according to FIG. 5.

The regenerated and sampled values of the picture signal are supplied to the picture memory M from the output of the converter DA2. The memory M consists of a memory tube of known design together with belonging auxiliary equipment for storing the incoming signal. The auxiliary equipment contains logic circuits for the control of the writing in and the reading out operation and for the erase operation of the information inscribed. The inputs of these logic circuits are connected to the output r32 of the counting circuits RR3, whereby the synchronizing signals appearing across this output control the writing in, the reading out, and the erase operation. From the picture memory M a signal is obtained containing all the picture and synchronizing information (a so called BAS-signal) and which is supplied to the subsequent picture tube B for presentation of the transmitted picture.

We claim:

1. A method of transmitting still pictures during a picture telephone transmission by means of picture signals which are produced by the scanning of successive parallel and preferably horizontal lines wherein each line is divided into a number of elements whose light intensity is converted to the picture signals, comprising the steps of:

dividing the scanned picture into a pre-determined number of line groups each containing a predetermined number of said parallel lines.

scanning each line group a given number of times and during each scanning of the lines sampling an element and then not sampling a plurality of following elements before sampling another element of the line, displacing the elements to be sampled for each new scanning of the line group in such a manner that after said given number of scans of a line group all the elements of the line group are sampled, storing a representation of the light intensity of each of the sampled elements in a line group, and serially transmitting over a telephone transmission line signals related to the stored information with at most such a timing which corresponds to the bandwidth of the telephone transmission line.

2. A method as claimed in claim 1 wherein a picture is divided into two fields which are alternatingly scanned, each field being divided into said line groups wherein at least one line group within the same field is scanned before the scanning of one line group in the other field, the positions of the scanning within each line group after the scanning of such a group being displaced in such a manner that, after a certain number of scannings, all the elements in one line group are sampled independent if the next following line group belongs to the same field or not, the representations of the light intensities of the sampled picture elements of the line groups scanned in each turn being stored, while such representations from the preceding group already stored are read out during at least the time which is required to store the following line group.

* * * * *